United States Patent Office 2,939,266
Patented June 7, 1960

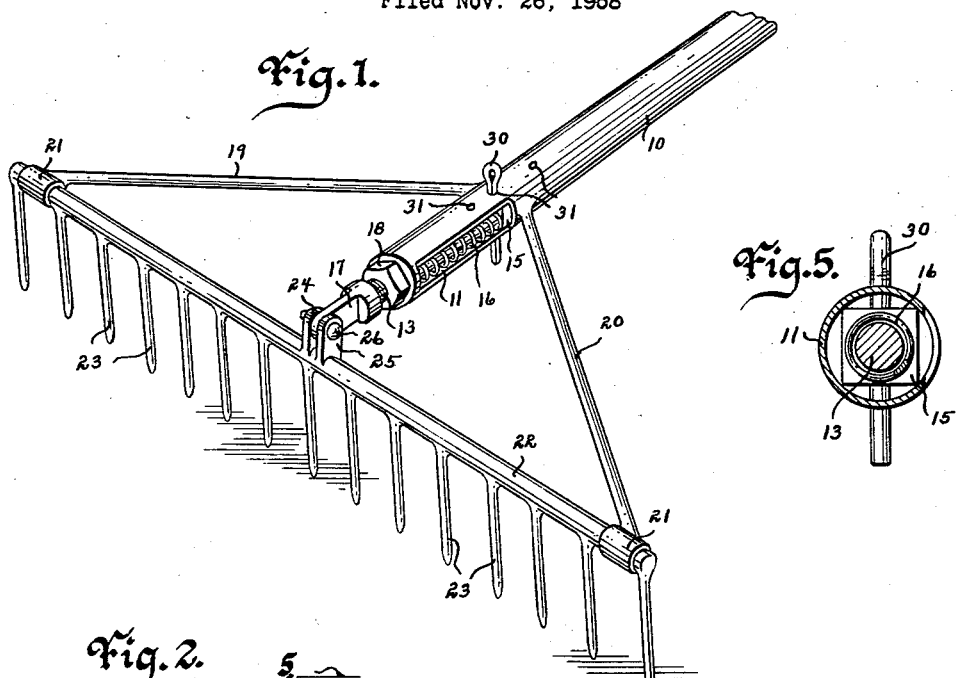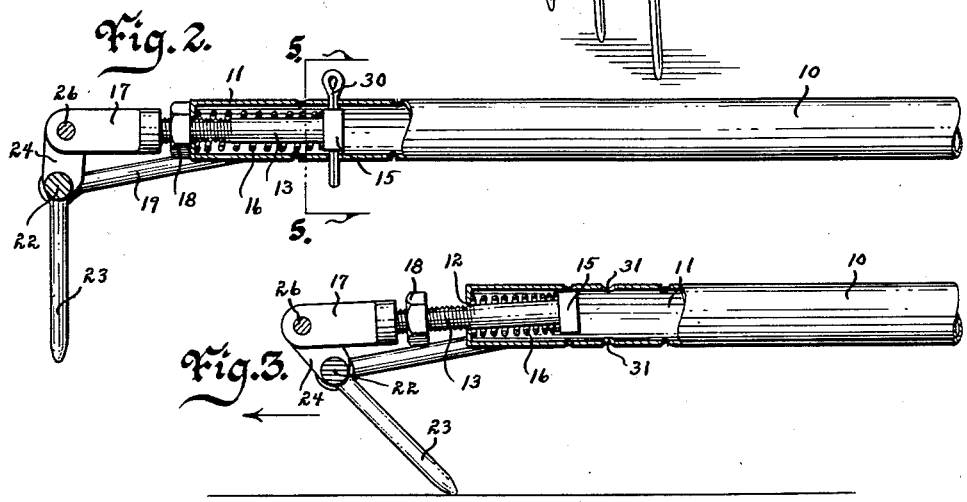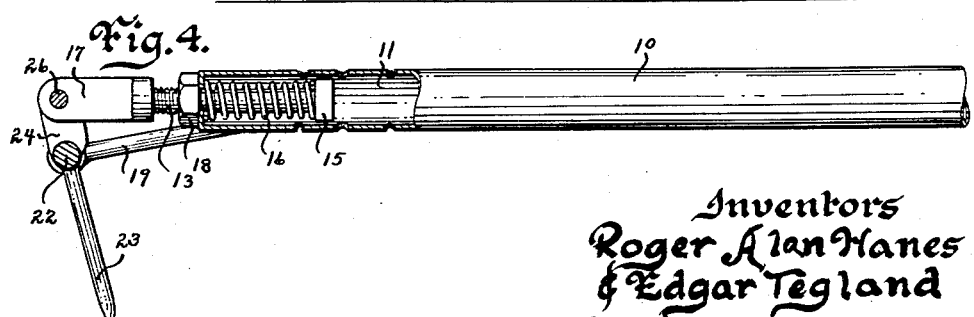

2,939,266

RAKE

Roger Alan Hanes, 1412 "A" St., and Edgar Tegland, 526 3rd Ave. N., both of Fort Dodge, Iowa Filed Nov. 26, 1958, Ser. No. 776,575

5 Claims. (Cl. 56—400.2)

This invention relates to hand rakes and more particularly to a self-cleaning one.

Hand rakes for lawn and garden usage are old. In general they comprise an elongated handle portion and a toothed head portion on the forward end of the handle. While they are universally used and are an excellent tool, they are most exasperating to the operator when leaves, debris, trash and like foul the teeth.

Therefore one of the principal objects of our invention is to provide a hand rake that is self-cleaning.

More specifically the object of this invention is to provide a rake that will operate in the usual manner when drawn toward the person employing the rake, while when pushed along the ground away from the operator, the rake head will tilt to bring its teeth parallel with the ground and thus permit wiping off or removal of all foreign matter therefrom.

A further object of the present invention is to provide a device of the nature indicated having locking means for holding the rake head rigidly in active or normal position, when desired.

A still further object of our invention is to provide a hand rake that may be adjustable as to the angle of its head to its handle, and when once adjusted the head carrying the teeth will be yieldingly held in such selected adjustment.

Further objects of our invention are to provide a self-cleaning hand rake that is economical in manufacture, durable in use and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Fig. 1 is a perspective view of our rake;

Fig. 2 is a side sectional view of our rake and more fully illustrates its construction;

Fig. 3 is a side sectional view of the rake showing the rake teeth at a self-cleaning angle;

Fig. 4 is a side sectional view of the rake illustrating the method of tooth adjustment; and Fig. 5 is an enlarged cross-sectional view of our rake taken on line 5—5 of Fig. 2.

As indicated, our rake has a spring loaded toothed head and this head is adapted to be slid forwardly, or away from the operator, by a downward or forward thrust of the handle, in order that the accumulations or foreign matter caught by the teeth, may be readily ejected therefrom to clear the teeth of the rake head, the rake head being returned to normal or active position as soon as the same is lifted from the ground or soil, or released.

Referring to the drawings, we have used the numeral 10 to designate the rake handle. The forward end 11 of the handle which may be in the form of a ferrule is hollow as shown in Fig. 3. The numeral 12 designates a hole in the center end of the end portion 11. Slidably extending through this hole is the rod 13. The numeral 15 designates a head on the rear of this rod and is located inside the end portion 11. The numeral 16 designates a coil spring in the end portion 11, around the rod 13, and has one end bearing on the forward end of the end portion 11 and its other end bearing on the head 15. Thus the spring 16 yieldingly holds the rod rearwardly of its longitudinal sliding movement. The numeral 17 designates a head bearing threaded on the forward end of the rod 13. From the head bearing 17, the rod 13 is threaded rearwardly as shown in Fig. 2. Threaded around this threaded portion is the nut 18. The numerals 19 and 20 designate two brace rods on the end portion 11, extending forwardly and outwardly away from each other as shown in Fig. 1. The numeral 21 designates a bearing on the outer end of each of the brace rods. The numeral 22 designates the horizontal base of the rake head having its two outer end portions rotatably extending through the two bearings 21 respectively. The numeral 23 designates spaced apart teeth on the head bar 22.

The numerals 24 and 25 designate two bearing ears on the head 22, parallel with the teeth 23, extending in the opposite direction therefrom and extending at each side, respectively, of the bearing head 17. The numeral 26 designates a bolt means, rivet, or like, extending through the ears 24 and 25, and the bearing head 17. The forward outward movement of the teeth 23 will be limited by the stop nut 18 engaging the end of the end portion 11 as shown in Fig. 2. When the nut is in this position the teeth 23 will be substantially at a right angle to the longitudinal axis of the handle 10. By threading the nut further toward the handle 10, the rod 13 will be further adjustably limited in its sliding movement to the rear and the rake teeth will extend downwardly and rearwardly accordingly, as shown in Fig. 4. Thus the normal raking position of the teeth may be adjusted to suit the desires of the user merely by adjustably positioning the nut 18 on the rod 13. While the lower ends of the teeth 23 cannot swing forwardly beyond the limits of the nut stop means 18, they may swing in the other direction, i.e., rearwardly and against the action of the yielding spring 16. Therefore when it is desired to clean foreign matter from the rake teeth, it is merely necessary to push the rake forwardly with the teeth ends engaging the earth, thereby moving the teeth into rearwardly folded condition under the end of the rake head support as shown in Fig. 3. This movement of the rake with folded teeth divests it of objectionable foreign matter. Upon raising the rake from the ground, or by moving the handle rearwardly, the teeth will straighten by action of the spring 16. In some instances it may be necessary to lock the rake teeth against rotary movement. This is done by selectively inserting a pin, cotter key, or like, 30, through holes 31 in the end portion 11 and the head member 15, as shown in Fig. 2. When it is desired to use the rake as a self-cleaning one the pin or like 30 is removed.

Some changes may be made in the construction and arrangement of our rake without departing from the real spirit and purpose of our invention, and it is our intention to cover by our claims, any modified forms of structure or use of mechanical equivalents which may be reasonably within their scope.

We claim:

1. In a rake, a handle having a hollow forward end portion; said hollow forward end portion being a continuation of said handle, a rake head operatively rotatably secured to said handle, a bearing projection on said rake head, a rod hinged at its forward end to said bearing projection and having its rear portion slidably extending into the hollow forward end portion of said handle, a stop nut adjustably threaded onto said rod forward of the hollow forward end portion of said handle for progressively adjustably limiting the movement of the rake head in one direction, and a spring means in the hollow forward end portion of said handle for yieldingly holding said rod against forward sliding movement.

2. In a rake, a handle having a hollow forward end portion; said hollow forward end portion being a continuation of said handle, a rake head operatively rotatably secured to said handle, a bearing projection on said rake head, a rod hinged at its forward end to said bearing projection and having its rear portion slidably extending into the hollow forward end portion of said handle, a stop nut adjustably threaded onto said rod forward of the hollow forward end portion of said handle for progressively adjustably limiting the movement of the rake head in one direction, and a spring means in the hollow forward end portion of said handle for yieldingly holding said rod against forward sliding movement; said rod and the hollow forward end portion of said handle having locking pin holes.

3. In a rake, a handle having a hollow forward end portion; said hollow forward end portion being a continuation of said handle, two supporting arms on said handle extending forwardly and outwardly away from each other, a rake head rotatably mounted to the outer ends of said arms, a projection on said rake head, a rod hinged to said projection and having its rear end portion slidably extending into the hollow forward end portion of said handle, a head on that end of the rod that is in the hollow forward end of said handle, a coil spring embracing the rear end portion of said rod having one end engaging the hollow forward end of said handle and its other end bearing on the head of the rod, and an adjustable positioned stop on said rod forward of the hollow forward end portion of said handle for progressively adjustably limiting the movement of the rake head in one direction.

4. In a rake, a handle having a hollow forward end portion; said hollow forward end portion being a continuation of said handle, two supporting arms on said handle extending forwardly and outwardly away from each other, a rake head rotatably mounted to the outer ends of said arms, a projection on said rake head, a rod hinged to said projection and having its rear end portion slidably extending into the hollow forward end portion of said handle, a head on that end of the rod that is in the hollow forward end of said handle, a coil spring embracing the rear end portion of said rod having one end engaging the hollow forward end of said handle and its other end bearing on the head of the rod, and a stop nut threaded on said rod forward of the hollow forward end portion of said handle for progressively adjustably limiting the movement of the rake head in one direction.

5. In a rake, a handle having a hollow forward end portion, two supporting arms on said handle extending forwardly and outwardly away from each other, a rake head rotatably mounted to the outer ends of said arms, a projection on said rake head, a rod hinged to said projection and having its rear end portion slidably extending into the hollow forward end portion of said handle, a head on that end of the rod that is in the hollow forward end of said handle, a coil spring embracing the rear end portion of said rod having one end engaging the hollow forward end of said handle and its other end bearing on the head of the rod, and an adjustable positioned stop on said rod forward of the hollow forward end portion of said handle; said head of said rod and said hollow forward end portion of said handle having holes adapted to receive a stop pin at times.

References Cited in the file of this patent
UNITED STATES PATENTS

| | | |
|---|---|---|
| 1,122,549 | Steele | Dec. 29, 1914 |
| 1,123,682 | Carroll | Jan. 5, 1915 |
| 1,197,003 | Anderson | Sept. 5, 1916 |
| 1,471,964 | Leas | Oct. 23, 1923 |
| 1,910,371 | Thiemann | May 23, 1933 |
| 2,093,064 | Whiddon | Sept. 14, 1937 |
| 2,126,719 | Beall | Aug. 16, 1938 |
| 2,343,033 | Swanson | Feb. 29, 1944 |
| 2,412,980 | Gould | Dec. 24, 1946 |
| 2,811,823 | Berglund | Nov. 5, 1957 |